US007839809B2

United States Patent
Godin et al.

(10) Patent No.: US 7,839,809 B2
(45) Date of Patent: Nov. 23, 2010

(54) UNINTERRUPTED MULTICAST SERVICE IN A RADIOCOMMUNICATION SYSTEM

(75) Inventors: Philippe Godin, Viroflay (FR); Yann Sehedic, Vanves (FR); Laurence Lautier, Plasir (FR)

(73) Assignee: Alcatel Lucent, Paris (FR)

( * ) Notice: Subject to any disclaimer, the term of this patent is extended or adjusted under 35 U.S.C. 154(b) by 719 days.

(21) Appl. No.: 11/547,116

(22) PCT Filed: Apr. 27, 2005

(86) PCT No.: PCT/EP2005/004498

§ 371 (c)(1),
(2), (4) Date: Sep. 24, 2007

(87) PCT Pub. No.: WO2005/109780

PCT Pub. Date: Nov. 17, 2005

(65) Prior Publication Data

US 2008/0020739 A1 Jan. 24, 2008

(30) Foreign Application Priority Data

May 7, 2004 (FR) .................................. 04 04978

(51) Int. Cl.
*H04B 7/00* (2006.01)
(52) U.S. Cl. ...................... 370/310; 370/328; 370/348; 370/349; 370/389
(58) Field of Classification Search ................ 370/310, 370/328, 338, 349, 389
See application file for complete search history.

(56) References Cited

U.S. PATENT DOCUMENTS

| 6,198,937 | B1 | 3/2001 | Spear et al. |
| 7,400,593 | B2 * | 7/2008 | Choi et al. .................. 370/310 |
| 2004/0071126 | A1 * | 4/2004 | Ramos-Escano et al. .... 370/349 |
| 2005/0213541 | A1 * | 9/2005 | Jung et al. ................... 370/331 |
| 2005/0233760 | A1 * | 10/2005 | Voltolina et al. ............ 455/503 |

FOREIGN PATENT DOCUMENTS

| DE | 10214934 A | 8/2003 |
| EP | 1420604 A | 5/2004 |

* cited by examiner

*Primary Examiner*—Barry W Taylor
(74) *Attorney, Agent, or Firm*—Fay Sharpe LLP

(57) ABSTRACT

In a method for multicast service continuity in a radio communications system, each radio network controller has a first identifier of each multicast service whose activation was previously requested by at least one radio terminal (1, 11) via said radio network controller and is adapted to notify radio terminals in a corresponding coverage area of the start of at least one session relating to one of said multicast services, reported by a core network, said notification incorporating the first identifier of said service. With respect to a radio terminal (11) entering the coverage area of a drift radio network controller (15) after having been in the coverage area of a serving radio network controller (14), the radio terminal having previously requested activation of a multicast service via the serving radio network controller, the first identifier of said service is sent from the serving radio network controller to the drift radio network controller.

8 Claims, 3 Drawing Sheets

UNINTERRUPTED MULTICAST SERVICE IN A RADIOCOMMUNICATION SYSTEM

The present invention relates to the implementation of multicast services in a radio communications system. It relates more particularly to the continuity of such multicast services within the radio communications system.

Implementing multicast services in radio communications systems is known in the art. Multicast services are services addressed to a set of terminals having a corresponding subscription. One example of these services that may be mentioned is the transmission of data relating to a selected topic (sports results, news, stock market information, etc.).

In the context of a radio communications system based on the UMTS (Universal Mobile Telecommunication System) technology, for example, an MBMS (Multimedia Broadcast/Multicast Service) function is provided to enable the implementation of such multicast services addressed to UMTS radio terminals. The architecture of the MBMS function is described in detail in the technical specification TS 23.246, "Technical Specification, Group Services and System Aspects; Multimedia Broadcast/Multicast Service (MBMS); Architecture and functional description (Release 6)", the latest version of which published by the 3GPP ($3^{rd}$ Generation Partnership Project) is version 6.2.0 of March 2004.

Figure 1:
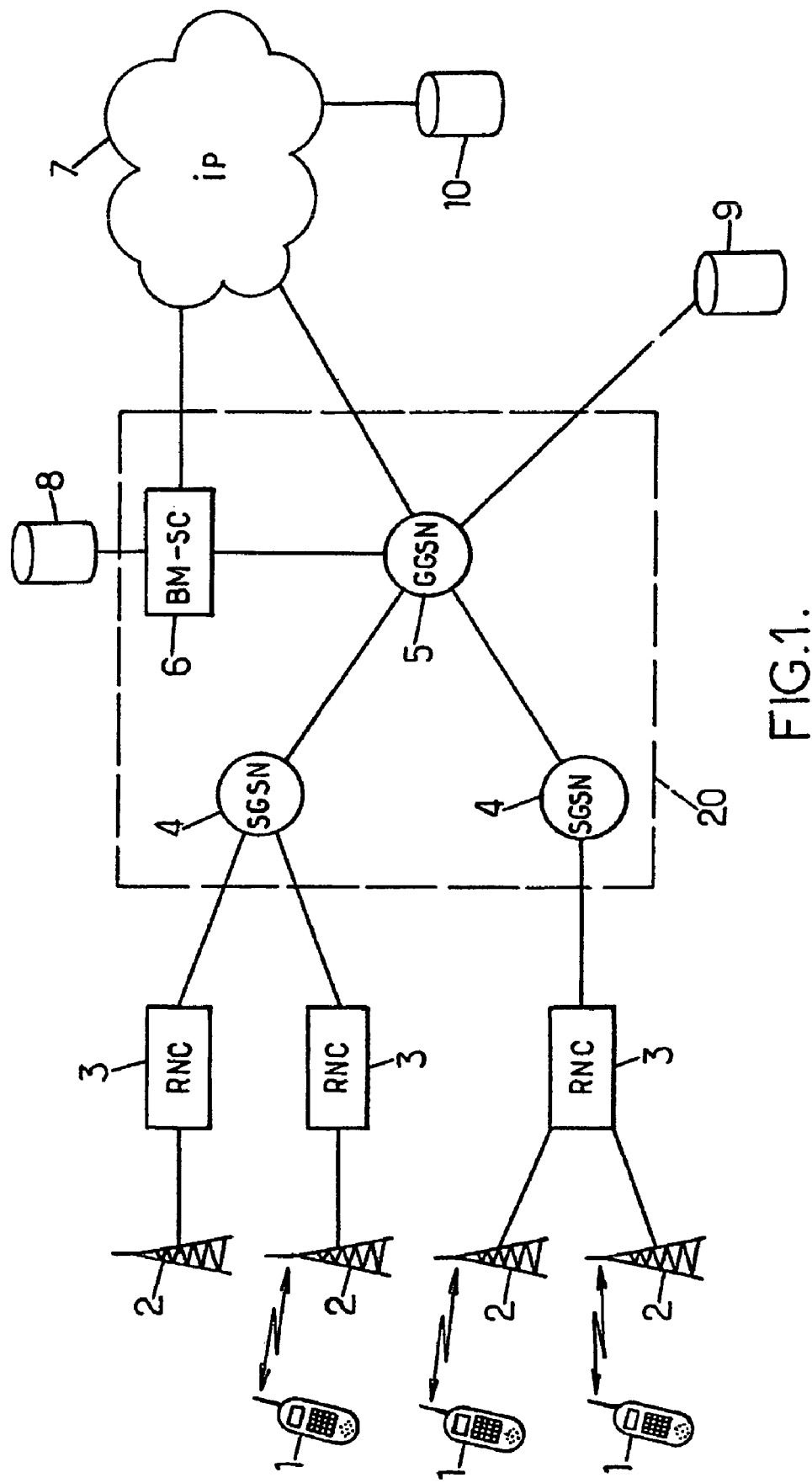

FIG. 1 shows a simplified architecture of a UMTS radio communications system enabling the implementation of MBMS multicast services.

Mobile radio terminals 1, known as UE (user equipments), are adapted to exchange information with radio network controllers (RNC) 3 via base stations 2, which are called Nodes B in UMTS terminology.

Moreover, the radio communications system illustrated comprises a core network 20 that is made up inter alia of interconnected switches 4-5 called SGSN (serving GPRS support nodes), at least some of which are connected to RNC 3, and GGSN (gateway GPRS support nodes). The GGSN 5 is a gateway for interfacing the UMTS to external networks such as an IP (Internet Protocol) data network 7.

Servers 8-10 are additionally adapted to provide service elements to UE 1 subscribing to the corresponding services via the UMTS system. The services in question may be of diverse kinds. They are adapted to be implemented as multicast services.

To this end, the core network 20 comprises a dedicated unit called the BM-SC 6 (broadcast/multicast service center) and conforming to the MBMS function, that implements broadcast and multicast services, as more particularly envisaged in the remainder of the description. In the example shown in FIG. 1, the BM-SC 6 is connected to the GGSN 5.

The BM-SC 6 is therefore able to implement multicast services from service elements obtained from the servers 8-10, for example topic data.

To be able to benefit from a given multicast service, a user having a UE 1 must first become a subscriber to the service, i.e. must subscribe to the service with the operator of the radio communications system concerned.

After that, the subscriber must request activation of the service in question in order to be added to the multicast group constituted for that service. This service activation procedure is described in section 8.2 of the above-mentioned Technical Specification TS 23.246. For the UE 1 concerned, it consists in particular in sending to the BM-SC 6 an identifier of the required service via the RNC 3 in the coverage area in which the user equipment is located and via certain SGSNs 4 and GGSNs 5. The identifier must identify the service uniquely. According to TS 23.246, it may for example associate an IP multicast address, corresponding for example to the IP address of the server adapted to deliver the service, with an APN (access point name), that is the access point name of the access point to which the corresponding server is connected. Because of the information that it contains, this identifier is of significant length. For example, if the identifier consists of the "IP multicast address +APN" association, it may be 70 bytes long or more. The SGSN needs this service identifier to determine which GGSN can reach the BM-SC associated with the service the activation that has been requested by the UE and to track the activation of the service as far as the BM-SC controlling access of the UE to the service.

It should be observed that the SGSN stores all MBMS services for which activation has been requested by a UE that is attached to it and the RNC in which the UE is situated. The GGSN stores all SGSNs in which there is at least one attached UE that has requested activation of an MBMS service. The BM-SC stores all GGSNs having an SGSN in which there is an attached UE that has requested the activation of an MBMS service. This storage is done during the execution of a procedure referred to as the "Registration" procedure and described in section 8.4 of the above-mentioned Technical Specification TS 23.246.

Following the service activation request by the UE 1, the UE 1 receives in response a simpler service identifier for designating the requested service. This identifier is for instance a TMGI (temporary mobile group identity), such as that specified in section 6.4 of the above-mentioned Technical Specification TS 23.246. The TMGI is much shorter than the above-mentioned unique service identifier.

Once the user concerned has requested the activation of a given service, the user will be in a position to receive information in the context of that service once a session relating to that service has started. The session start procedure is described in details in section 8.3 of the above-mentioned Technical Specification TS 23.246

This procedure, initiated by the BM-SC 6, enables activation of the resources of the radio communications system needed to multicast the service concerned. The BM-SC sends a session start indication to all previously stored GGSNs. The GGSN sends the indication to all previously stored SGSNs. The SGSN sends the indication to all RNCs under which are attached UEs that requested activation of the service concerned for the session in question. For example, the RNC 3 whose coverage area contains the UE 1 which subscribes to said service and that previously requested activation of the service via said RNC coverage area is informed that the service is about to start by the BM-SC 6 via the GGSN 5 and certain SGSNs 4. The RNC 3 then notifies this session start, for example by means of a paging message on the radio channel. This notification incorporates the simplified identifier of the service that is about to start, that is typically the TMGI corresponding to that service, which it obtained previously from the core network, more particularly from the BM-SC.

Upon receipt of the notification, the UE 1, which also has the TMGI, notes that the service corresponding to this TMGI is about to start. It is then in a position to receive information in the context of the service implemented. The same applies to all UEs subscribing to this service and that have requested activation of the service, because all these UEs are then part of the same multicast group and therefore know the same TMGI.

A problem nevertheless arises if a UE enters the coverage area of a new RNC, i.e. enters into radio communication with a base station controlled by a new RNC. This can occur as a result of moving between a cell covered by a base station controlled by a first RNC and a cell covered by a base station controlled by a second RNC, for example.

Figure 2:
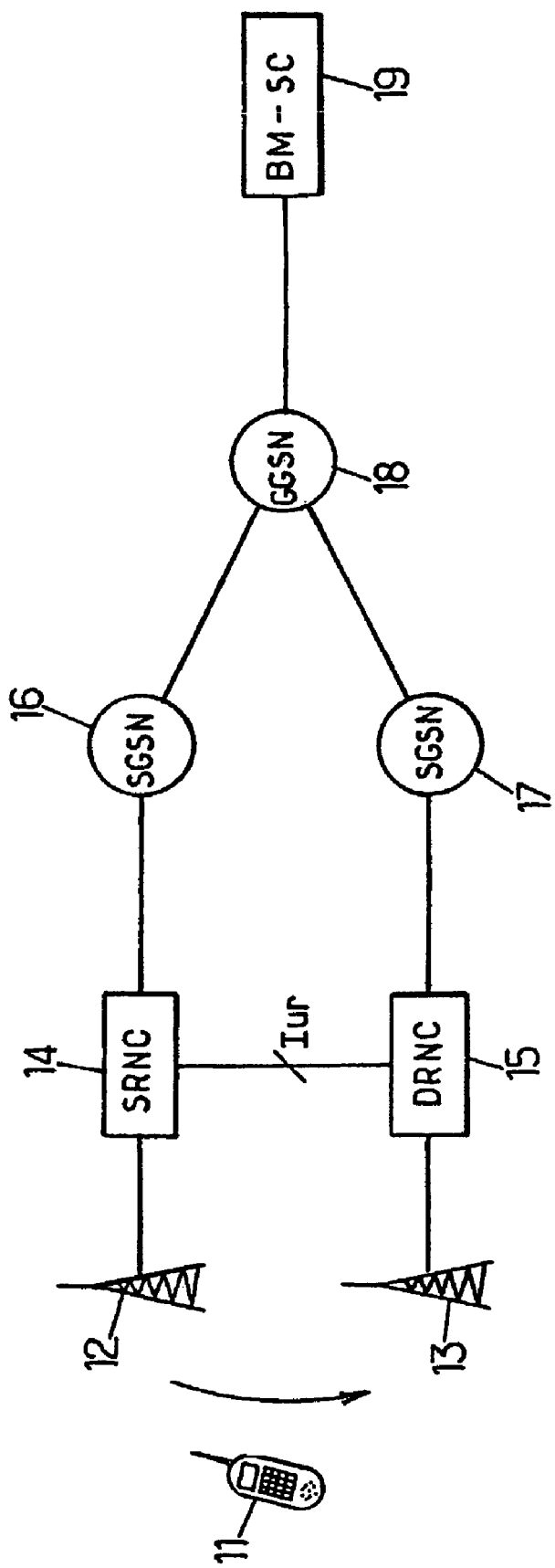

FIG. 2 illustrates this situation. It shows a UE 11 that initially has a radio link with the base station 12 under the control of a radio network controller 14 referred to as "serving" (or else SRNC ("Serving RNC")) and that moves into radio communication with the base station 13 that it is connected to the radio network controller 15, referred to as "relay", also called DRNC (for "Drift RNC"). The interface between the SRNC and the DRNC is called the Iur interface. It is defined in the 3GPP Technical Specification TS 25.401, "UTRAN Overall Description", version 3.1.0, published in January 2000 by the 3GPP.

Once the UE 11 submitted a request for activation of a given service when it was in the coverage area of the SRNC 14, this request was forwarded by the SRNC 14 to the BM-SC 19 via the SGSN 16 and the GGSN 18. Afterwards, when a session relating to this service starts, the SRNC 14 is informed of it via the SGSN 16. However, once the UE 11 has moved and entered into the coverage area of the DRNC 15 after its service activation request, the SRNC 14 is no longer in a position to notify it of the session start.

Moreover, as the request for activation of the service by the UE 11 does not pass through the DRNC 15 in this case, the BM-SC 19 does not necessarily report the starting of a session for the service required by the UE 11 to the DRNC 15. In fact, the core network is not generally aware of a UE moving from an SRNC to a DRNC.

The above-mentioned MBMS registration procedure of section 8.4 of the TS 23.246 may be used to overcome this problem. According to that procedure, the DRNC 15 indicates to the core network to which it is connected that it wishes to be informed of the starting of a session relating to a given service. Once the registration procedure has been completed, the DRNC 15 is stored in a list of RNCs to which the starting of a session relating to said service must be reported, this list being managed at the level of the core network. Once the start of such session is indicated to the DRNC 15, the DRNC 15 is in a position to notify the session start to the UE 11 via the base station 13.

However, to be able to do this, the DRNC 15 needs to know for which services the UE 11 requested activation when it was in the coverage area of the SRNC 14. In particular, the DRNC 15 needs a complete identifier for each of the services for which activation was requested beforehand by the UE 11.

Now, the MBMS function as presently specified gives no indication as to how a DRNC can obtain the complete identity of services for which activation was previously requested by a UE that has entered its coverage area.

One object of the present invention is to overcome this shortcoming, i.e. to enable a DRNC to know which services for which activation was previously requested by a UE that has just entered its coverage area.

Another object of the invention is to enable the core network to inform a DRNC of the starting of a session relating to a service for which activation was previously requested by a UE that has just entered its coverage area.

Another object of the invention is to enable a DRNC to notify the starting of a session relating to a service for which activation was previously requested by a UE that has just entered its coverage area.

The invention therefore proposes a method of ensuring multicast service continuity in a radio communications system comprising a core network and at least two radio network controllers connected to the core network. Each radio network controller has a first identifier of each of the multicast services for which activation was previously requested by at least one radio terminal via said radio network controller and is adapted to notify radio terminals located in a coverage area of said radio network controller of the starting of at least one session relating to one of said multicast services, reported by the core network, the notification incorporating the first identifier of said service. With respect to a radio terminal entering the coverage area of a drift radio network controller after having been in the coverage area of a serving radio network controller each being one of said radio network controllers, said radio terminal having previously requested activation of a multicast service via the serving radio network controller, the method comprises a step of sending the first identifier of said service from the serving radio network controller to the drift radio network controller.

Sending the first identifier of the service from the serving radio network controller to the drift radio network controller enables the latter to determine that the service for which activation was previously requested by said radio terminal is one of the services that have already been the subject of an activation request by other terminals via its intermediary. Accordingly, there is already provision for this drift radio network controller to be informed by the core network of the starting of a session relating to said service (it acts as the SRNC for other UEs that have requested activation of the same service and therefore it does not need to register with its SGSN to be informed of the starting of the service). When this drift radio network controller notifies this start in its coverage area, the incoming terminal concerned will be able to receive such a notification and therefore be able to benefit from the service the activation of which it previously requested.

However, whenever no radio terminal has previously requested activation of said service via the drift radio network controller, the following steps are advantageously executed:

requesting, from the drift radio network controller, the sending by the serving radio network controller of the second identifier of the service for which activation was previously requested by said radio terminal, the request incorporating the first identifier of said service;

in response, sending from the serving radio network controller, to the drift radio network controller, the second identifier of said service; and requesting, from the drift radio controller that the core network reports to it the starting of a session relating to said service, the request incorporating the second identifier of said service sent to the drift radio network controller.

In other words, the drift radio network controller obtains from the serving radio network controller a second identifier, longer than the first, of the service required by the radio terminal. Then, on the basis of this identifier, a registration procedure is carried out from the drift radio network controller. At the end of this procedure, the drift radio network controller is then one of the radio network controllers which will be informed of the starting of a session relating to said service. It is then in a position to notify this start in its coverage area, so that the radio terminal concerned is informed of the starting of the service.

The multicast services are advantageously implemented in the radio communications system in accordance with the MBMS function.

Moreover, the second service identifier may be a unique service identifier as described in the introduction, for example an "IP multicast address +APN" association. The shorter first service identifier may be the TMGI as mentioned above, for example.

The invention also proposes a radio network controller in a radio communications system further comprising a second radio network controller and a core network to which said radio network controller is connected, the radio network controller comprising means for obtaining a first identifier of each multicast service for which activation was previously requested by at least one radio terminal via said radio network controller, and the radio network controller further comprising means for with respect to a radio terminal entering the coverage area of the second radio network controller after having been in the coverage area of said radio network controller, said radio terminal having previously requested activation of a multicast service via said radio network controller, sending the first identifier of said service to the second radio network controller.

This radio network controller is a serving radio network controller in relation to said radio terminal.

It advantageously further comprises means for obtaining a second identifier of each multicast service for which activation was previously requested by at least one radio terminal via said radio network controller, the second identifier of each service being longer than the first identifier of the same service. It further comprises, whenever no radio terminal has previously requested activation of said service via the second radio network controller:

means for receiving from the second radio network controller, a request to send the second identifier of the service for which activation was previously requested by said terminal, the request incorporating the first identifier of said service; and means for sending in response the second identifier of said service to the second radio network controller.

The invention further proposes a radio network controller in a radio communications system further comprising a second radio network controller and a core network to which the radio network controller is connected, the radio network controller comprising means for obtaining a first identifier of each multicast service for which activation was previously requested by at least one radio terminal via said radio network controller and means for notifying radio terminals located in a coverage area of said radio network controller of the starting of at least one session relating to one of said multicast services, reported by the core network, the notification incorporating the first identifier of said service. It further comprises means for, with respect to a radio terminal entering its coverage area after having been in the coverage area of the second radio network controller, said radio terminal having previously requested activation of a multicast service via the second radio network controller, receiving the first identifier of said service from said second radio network controller.

This radio network controller is a drift radio network controller in relation to said radio terminal.

It advantageously further comprises means for requesting that the core network reports to it the starting of a session relating to a multicast service, the request incorporating a second identifier of said service previously obtained by said radio network controller, the second identifier of each service being longer than the first identifier of the same service. The radio network controller further comprises, whenever no radio terminal has previously requested activation of said service via said radio network controller, the request incorporating the first identifier of said service:

means for requesting the sending by the second radio network controller of the second identifier of the service for which activation was previously requested by said radio terminal;

means for receiving in response the second identifier of said service from the second radio network controller; and means for requesting that the core network reports to it the starting of a session relating to said service, the request incorporating the second identifier of said service received by the means for receiving the second identifier of said service from the second radio network controller.

Figure 4:
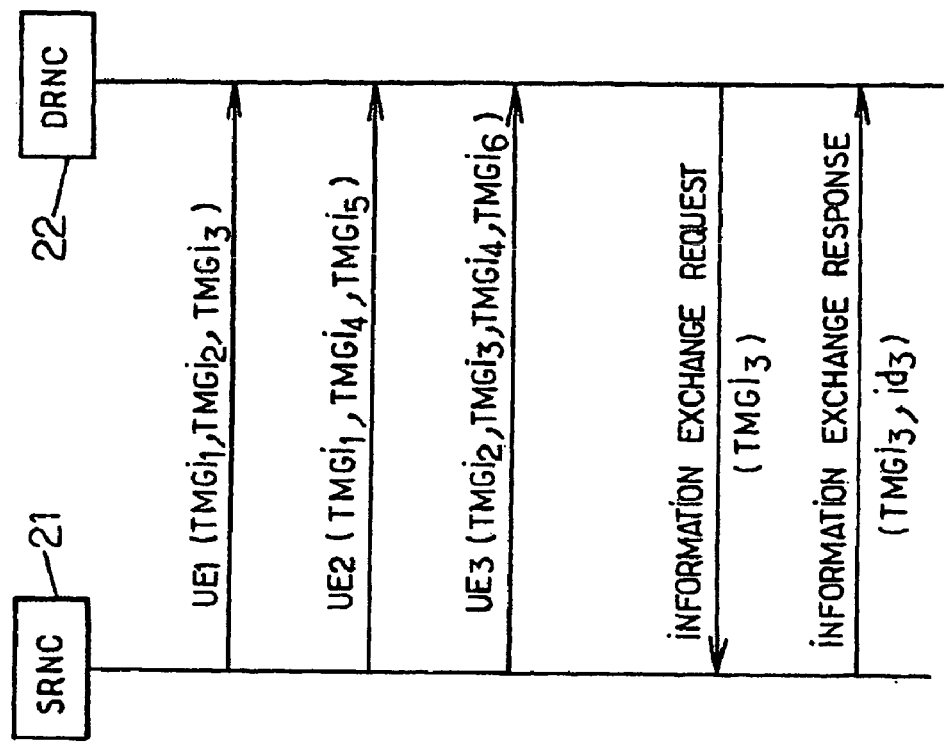
Figure 3:
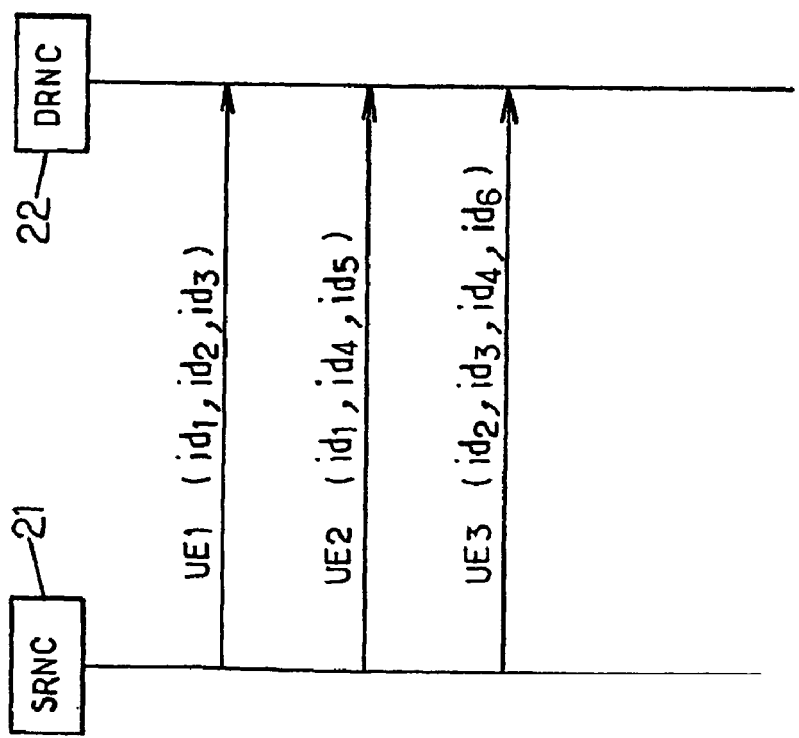

Other features and advantages of the present invention become apparent from the following description of non-limiting example embodiments of the invention, given with reference to the appended drawings, in which:

FIG. 1, already commented on, is a diagram representing a simplified architecture of a radio communications system using the MBMS function;

FIG. 2, already commented on, is a diagram representing a simplified architecture of a radio communications system in which the invention may be used;

FIG. 3 is a diagram representing an exchange of signaling between radio network controllers adapted to overcome the shortcomings of the prior art referred to above; and FIG. 4 is a diagram representing an exchange of signaling between radio network controllers according to the invention.

With reference to FIG. 2, there follows a description of a first way to overcome the shortcomings of the prior art referred to in the introduction. Accordingly, a unique identifier of each service for which activation was previously requested by the UE 11 via the SRNC 14, i.e. when it was in the coverage area of the SRNC 14, is sent to the DRNC 15 by the SRNC 14.

In fact, as mentioned in the introduction, the SRNC 14 has a unique identifier, such as a "IP multicast address +APN" association, for each service for which the UE 11 has requested activation. This identifier is made available to the SRCN 14 following an "MBMS UE linking" procedure described in section 8.15 of the above-mentioned TS 23.246, for example.

The SRNC 14 communicates these unique service identifiers to the DRNC 15 once the UE 11 enters the coverage area of the DRNC 15, by means of an exchange of signaling over the Iur interface between the SRNC 14 and the DRNC 15. It may advantageously employ existing signaling messages for transmission over that interface.

For example, the "Radio Link Setup" information exchange procedure described in particular in the Technical Specification TS 25.423, version 5.9.0, Release 5, "UTRAN Iur interface Radio Network Subsystem; Application Part (RNSAP) signaling", published in March 2004 by the 3GPP, may be used for such transmission. According to that procedure, the SRNC 14 responds to finding that the UE 11 has moved from its coverage area into that of the DRNC 15 by sending the DRNC 15 the identifiers of the services requested by the UE 11.

FIG. 3 shows such transmission in this mode of operation. The example illustrated by this figure assumes that three terminals UE1, UE2 and UE3 are initially in the coverage area of an SRNC 21, i.e. have a radio connection with a base station controlled by the SRNC 21. Each of these terminals subscribe to different services and has requested activation of the services via the SRNC 21, i.e. when it was in the coverage area of the SRNC 21. As a result of moving around, for example, the terminals subsequently enter the coverage area of a new RNC 22, which in relation to these terminals is a DRNC.

For each of the three terminals concerned, the SRNC 21 sends the complete unique identifiers of the services for which activation was requested by the corresponding terminals when they were in the coverage area of the SRNC 21.

Accordingly, in the present example, the SRNC 21 sends the DRNC 22 the complete identifiers $id_1$, $id_2$ and $id_3$ of the three services for which activation was requested by UE1 via the SRNC 21. Similarly, the three identifiers $id_1$, $id_4$ and $id_5$ of the services for which activation was requested by UE2 via the SRNC 21 and the four identifiers $id_2$, $id_3$, $id_4$ and $id_6$ of the services for which activation was requested by UE3 via the SRNC 21 are sent to the DRNC 22 by the SRNC 21.

It should be observed that some of the requested services are common to some of the terminals (for example the service with identifier $id_2$ to the terminals UE1 and UE2, the service with identifier $id_2$ to the terminals UE1 and UE3, and the service with identifier $id_4$ to the terminals UE2 and UE3). However, other services were the subject of a request for activation via the SRNC 21 by only one of the three terminals (for example the service with identifier $id_5$ in the case of the terminal UE2 and the service with identifier $id_6$ in the case of the terminal UE3).

It is therefore clear that after this procedure, effected over the interface Iur between the SRNC 21 and the DRNC 22, the DRNC 22 knows all services for which activation was previously requested by each UE via the SRNC 21, i.e. when it was in the coverage area of the SRNC 21, each service being immediately identified by its complete identifier (for example "IP multicast address +APN"). The DRNC 22 is then in a position to initiate a registration procedure with the BM-SC of the core network to which it is connected, so that starting a session for one of the services with identifiers $id_1$ to $id_6$ is reported to it by the core network. Thereafter, the DRNC 22 can notify that start, so that the UE concerned may be informed of it.

It will nevertheless be observed that the procedure described above is cumbersome and less than optimum. In fact, the example illustrated by FIG. 3 shows that the identifiers of services for which activation has been requested for a plurality of UEs are sent from the SRNC 21 to the DRNC 22 more than once. If each unique service identifier comprises around 70 bytes, the redundant transfer is costly in terms of resources.

The message sent over the Iur interface relating to UE1 or UE2, each of which has requested three services, is of at least 210 (3×70) bytes, whereas the message sent over the Iur interface relating to UE3, which has requested the activation of other services, is of at least 280 (4×70) bytes. This represents all the more of a penalty in that some of the requested services are common to different terminals, as indicated above.

It will further be observed that the procedure for signaling over the Iur interface may be based on existing messages that may carry information over and above the MBMS service identifiers. For example, these messages may also include information used in the context of establishing resources on the DRNC. A significant increase in the length of these messages may then penalize other mechanisms linked to sending the messages, such as the allocation of resources on the DRNC.

The invention therefore provides another mechanism for overcoming the shortcomings of the prior art described in the introduction that avoids the drawbacks of the solution described above.

This mechanism is described with reference to an example illustrated by FIG. 4 and using the same assumptions as the previous example described with reference to FIG. 3. Accordingly, the SRNC 21 sends the DRNC 22 via the Iur interface a list of the TMGI corresponding to the services for which each UE previously requested activation via the SRNC 21 (i.e. when it was in the coverage area of the SRNC 21). For example, such transmission is effected when it is noted that a given terminal has moved from the coverage area of the SRNC 21 to that of the DRNC 22.

In the present example, the SRNC 21 therefore indicates to the DRNC 22 the identifiers $TMGI_1$, $TMGI_2$, and $TMGI_3$ of the services for which activation was previously requested by UE1, the identifiers $TMGI_1$, $TMGI_4$ and $TMGI_5$ of the services for which activation was previously requested by UE2, and the identifiers $TMGI_2$, $TMGI_3$, $TMGI_4$ and $TMGI_6$ of the services for which activation was previously requested by UE3.

It should be remembered that the identifiers $TMGI_1$ to $TMGI_6$ are available at the level of the SRNC 21. In fact, these identifiers are supplied to the SRNC 21 at the same time as the complete identifiers, for example during the "MBMS UE linking" procedure described in section 8.15 of the above-mentioned TS 23.246.

Moreover, in the great majority of cases, the DRNC 22, which is effectively a drift RNC vis-à-vis UE1, UE2 and UE3, is also a serving RNC, i.e. an SRNC, for other UEs, since the UEs are generally distributed randomly in the coverage area of the radio communications system. What is more, it is highly probable that some of the services for which activation has been requested via the DRNC 22 acting as SRNC for some of these UE are common to some of the services requested by UE1, UE2 or UE3. Because of this, the DRNC 22 has already relayed a request for activation of these services to the BM-SC and is therefore informed of the starting of a session relating to one of these services by the BM-SC, as explained above.

It is considered below that the services with the respective identifiers $TMGI_1$, $TMGI_2$ and $TMGI_4$ to $TMGI_6$ (or the complete identifiers $id_1$, $id_2$ and $id_4$ to $id_6$) have already been the subject of activation requests via the DRNC 22 acting as SRNC vis-à-vis certain UEs. However, the service with identifier $TMGI_3$ (or $id_3$) has not yet been the subject of an activation request by a UE via the DRNC 22.

For services with respective identifiers $TMGI_1$, $TMGI_2$ and $TMGI_4$ to $TMGI_6$, it follows from the above that the DRNC 22 is informed by the core network of the starting of a session relating to one of the services. Accordingly, when the DRNC 22 receives an indication that a session is starting relating to the service associated with $TMGI_1$ or $TMGI_2$, it notifies that start in its coverage area. The notification is then received by UE1, in addition to the other UEs that have previously requested activation of the service via the DRNC 22, acting as SRNC.

It is therefore clear that, in the great majority of cases, simply sending the identifiers TMGI to the DRNC 22 is sufficient for the DRNC to notify the starting of multicast services to UE1, UE2 and UE3. Now, as indicated above, a TMGI is much shorter than a complete service identifier of the "IP multicast address +APN" type, and so the messages sent over the Iur interface are of limited size, which limits the drawbacks of the solution mentioned above. Moreover, unnecessary registration procedures from the DRNC 22 are avoided.

As for the service identified by $TMGI_3$ or $id_3$, for which activation was requested by UE1 and UE3 via the SRNC 21, it is considered that it has not been the subject of any activation request via the DRNC 22 acting as SRNC by a UE situated in the coverage area of the DRNC 22, i.e. in radio communication with a base station controlled by the DRNC 22. In this situation, which in practice is very much a minority situation, the DRNC 22 does not have the corresponding complete identifier $id_3$. Moreover, the corresponding short identifier $TMGI_3$ received from the SRNC 21 is not sufficient for the DRNC 22 to carry out a registration procedure as described above, since that procedure only uses the complete identifiers id.

In this particular situation, the DRNC 22 then advantageously requests the SRNC 21 to supply it the unique identifier of the corresponding service. This is shown at the bottom of the FIG. 4 diagram, with the DRNC 22 sending a request ("information exchange request") to the SRNC 21 over the Iur interface. It includes in that request the identifier TMGI$_3$ of the service for which it wishes to receive the complete identifier. The SRNC 21 then responds with a message ("information exchange response") containing the corresponding unique service identifier, namely id$_3$, possibly together with the identifier RMGI$_3$ received. Accordingly, the identifier id$_3$ is transmitted only once over the Iur interface regardless of the number of UEs that have requested the corresponding service, which avoids unnecessarily overloading the Iur interface.

On receipt of this response message, the DRNC 22 is then in a position to carry out a registration procedure as described above, so as to indicate to the core network to which it is connected that it requires to be informed of the starting of a session relating to the service with identifier id$_3$. Afterwards, when any such session starts, the DRNC 22 is then informed of it and may notify this start so that UE1 and UE3, which previously requested activation of that service via the SRNC 21, are themselves informed of it.

By means of the mechanism described above, a DRNC is therefore able to be informed of, and therefore able to notify, the starting of sessions relating to multicast services for which activation has been requested beforehand by UEs via an SRNC. What is more, this mechanism limits the quantity of information exchanged over each interface Iur between the DRNC concerned and any SRNC. It further avoids a multitude of registration procedures following the DRNC by utilizing information already obtained relating to UEs served by this DRNC acting as an SRNC.

The invention claimed is:

1. A method for ensuring multicast service continuity in a radio communications system comprising a core network (20) and at least two radio network controllers (3, 14, 15, 21, 22) connected to the core network, wherein each radio network controller has a first identifier of each of the multicast services for which activation was previously requested by at least one radio terminal (1, 11) via said radio network controller and is adapted to notify radio terminals located in a coverage area of said radio network controller of the starting of at least one session relating to one of said multicast services, reported by the core network, the notification incorporating the first identifier of said service, wherein each radio network controller also has a second identifier of each of the multicast services for which activation was previously requested by at least one radio terminal via said radio network controller, the second identifier of each service being longer than the first identifier of the same service, the method comprising, with respect to a radio terminal (11) entering the coverage area of a drift radio network controller (15) after having been in the coverage area of a serving radio network controller (14) each being one of said radio network controllers, said radio terminal having previously requested activation of a multicast service via the serving radio network controller, a step of sending the first identifier of said service from the serving radio network controller to the drift radio network controller.

2. A method according to claim 1, wherein each radio network controller is further adapted to request that the core network reports to it the starting of a session relating to a multicast service, the request incorporating the second identifier of said service previously obtained by said radio network controller, the method further comprising the following steps, whenever no radio terminal has previously requested activation of said service via the drift radio network controller (15):

requesting, from the drift radio network controller, the sending, by the serving radio network controller (14), of the second identifier of the service for which activation was previously requested by said radio terminal (11), the request incorporating the first identifier of said service;

in response sending, from the serving radio network controller, to the drift radio network controller, the second identifier of said service; and requesting, from the drift radio controller that the core network reports to it the starting of a session relating to said service, the request incorporating the second identifier of said service sent to the drift radio network controller.

3. A method according to claim 1, wherein said radio terminal (11) enters the coverage area of the drift radio network controller (15) after having been in the coverage area of the serving radio network controller (14) as a consequence the said radio terminal having moved.

4. A method according to claim 1, wherein the multicast services are implemented in the radio communications system in accordance with the MBMS (Multimedia Broadcast/Multicast Service) function.

5. A method according to claim 1, wherein the second identifier of a service comprises an association of an address relating to a server (8, 9, 10) adapted to deliver information relating to said service and an access point in the core network to which said server is connected.

6. A radio network controller (14, 21) in a radio communications system further comprising a second radio network controller (15, 22) and a core network (20) to which said radio network controller is connected, the radio network controller comprising means for obtaining a first identifier of each multicast service for which activation was previously requested by at least one radio terminal (1, 11) via said radio network controller, the radio network controller further comprising means for obtaining a second identifier of each multicast service for which activation was previously requested by at least one radio terminal via said radio network controller, the second identifier of each service being longer than the first identifier of the same service, and the radio network controller further comprising means for, with respect to a radio terminal (11) entering the coverage area of the second radio network controller (15) after having been in the coverage area of said radio network controller (14), said radio terminal having previously requested activation of a multicast service via said radio network controller, sending the first identifier of said service to the second radio network controller.

7. A radio network controller according to claim 6, further comprising, whenever no radio terminal has previously requested activation of said service via the second radio network controller (15):

means for receiving from the second radio network controller, if a request to send the second identifier of the service for which activation was previously requested by said terminal (11), the request incorporating the first identifier of said service; and means for sending in response the second identifier of said service to the second radio network controller.

8. A radio network controller (15, 22) in a radio communications system further comprising a second radio network controller (14, 21) and a core network (20) to which the radio network controller is connected, the radio network controller comprising means for obtaining a first identifier of each multicast service for which activation was previously requested by at least one radio terminal (1, 11) via said radio network controller and means for notifying radio terminals located in a coverage area of said radio network controller of the starting of at least one session relating to one of said multicast services, reported by the core network, the notification incorporating the first identifier of said service, the radio network controller further comprising means for, with respect to a radio terminal (11) entering its coverage area after having been in the coverage area of the second radio network controller, said radio terminal having previously requested activation of a multicast service via the second radio network controller, receiving the first identifier of said service from said second radio network controller, the radio network further comprising means for requesting that the core network reports to it the starting of a session relating to a multicast service, the request incorporating a second identifier of said service previously obtained by said radio network controller, the second identifier of each service being longer than the first identifier of the same service, the radio network controller further comprising, whenever no radio terminal has previously requested activation of said service via said radio network controller, the request incorporating the first identifier of said service:

means for requesting the sending by the second radio network controller of the second identifier of the service for which activation was previously requested by said radio terminal (11), means for receiving in response the second identifier of said service from the second radio network controller; and means for requesting that the core network reports to it the starting of a session relating to said service, the request incorporating the second identifier of said service received by the means for receiving the second identifier of said service from the second radio network controller.

\* \* \* \* \*